United States Patent [19]

Robel

[11] 4,218,177
[45] Aug. 19, 1980

[54] COHESION TYPE TURBINE

[76] Inventor: Robb W. Robel, PSC Box 486, McClellan A.F.B., Sacramento, Calif. 95652

[21] Appl. No.: 69,065

[22] Filed: Aug. 23, 1979

[51] Int. Cl.³ .......................... F01D 1/36; F03B 5/00
[52] U.S. Cl. .................................. 415/90; 415/76; 415/165; 415/219 B
[58] Field of Search ............... 415/90, 76, 165, 219 B, 415/216, 217, 218

[56] References Cited

U.S. PATENT DOCUMENTS

| | | | |
|---|---|---|---|
| 699,636 | 5/1902 | Thrupp | 415/90 X |
| 1,061,206 | 5/1913 | Tesla | 415/90 |
| 1,323,542 | 12/1919 | Naylor | 415/165 |
| 1,383,937 | 7/1921 | Guthrie | 415/76 |
| 1,402,053 | 1/1922 | Dake | 415/90 |
| 1,429,570 | 9/1922 | Dake | 415/90 |
| 2,036,018 | 3/1936 | Caldwell | 415/76 |
| 2,640,678 | 6/1953 | Andersen | 415/76 |
| 3,404,867 | 10/1968 | Williams et al. | 415/90 |
| 3,923,416 | 12/1975 | Frey | 415/76 |
| 4,025,225 | 5/1977 | Durant | 415/90 |

*Primary Examiner*—Stanley N. Gilreath
*Attorney, Agent, or Firm*—Melvin R. Stidham

[57] ABSTRACT

A cohesion type turbine having a plurality of axially spaced stacks of discs. Each stack is comprised of a plurality of thin, highly polished discs which are separated by spacers. The discs and spacers are non-rotatably mounted on a shaft which is rotatably mounted in a housing. The housing has a nozzle mounted thereon to direct a fluid medium to an intermediate stack of discs along chords of the discs, and a transition duct having a single portion inlet for receiving the fluid medium from the intermediate stack of discs and a bifurcated portion for directing the fluid medium to the axially outer stacks of discs along chords thereof.

7 Claims, 4 Drawing Figures

COHESION TYPE TURBINE

BACKGROUND OF THE INVENTION

Most turbines in use today are of either the impulse or the reaction types. Such turbines have demonstrated satisfactory performance but, particularly because of the high stresses to which they are subjected, their manufacture requires use of exotic materials and fabrication techniques. Some work has also been done with cohesion type turbines wherein a series of discs are driven by friction of a fluid or saturated vapor at high speed across these surfaces. However, such turbines have seen only limited success.

OBJECTS OF THE INVENTION

It is an object of this invention to provide a cohesion type turbine which may be constructed at relatively low cost, but which is efficient and effective in operation.

Other objects and advantages of this invention will become apparent from the description to follow, particularly when read in conjunction with the accompanying drawings.

BRIEF SUMMARY OF THE INVENTION

In carrying out this invention, I provide a plurality of thin, highly polished metallic discs which are disposed alternately with spacers and which are bolted together in a stack. The first, high pressure stage is disposed in the middle, with the two stacks, together making up the secondary stage disposed on either side, and each of the three groups is embraced by thicker, strength discs. Jets of fluid or saturated vapor are directed between the discs of the first stage at an angle and along a chord and emerge into a transfer duct substantially at the end of the chord. The transfer duct is bifurcated into two ducts which divide the stream and introduce it into the two stacks of the second stage. The fluid or vapor emerging from the second stage is directed to a condenser and then recycled.

DESCRIPTION OF A PREFERRED EMBODIMENT

Figure 1:
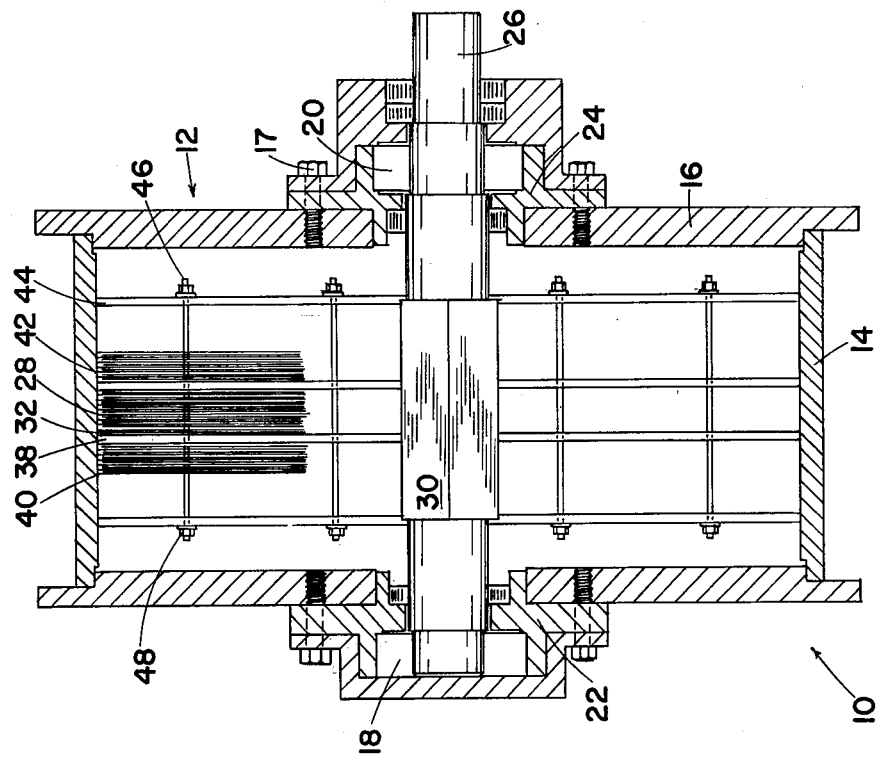
FIG. 1 is a section of a cohesion-type turbine embodying the features of this invention.

Referring now to FIG. 1 with greater particularity, the cohesion-type turbine 10 of this invention includes a housing 12 which may comprise a body band 14 clamped between a pair of end plates 16. Bearings 18 and 20 are secured in bearing cups 22 and 24, which are bolted to the side plates 16 by bolts 17 and rotatably receive the shaft 26. A first stage series of thin, highly polished discs 28 are non-rotatably received on a square section 30 of the shaft 26 in order to impart rotation thereto, as will hereinafter be described. The discs 28 are in the nature of 0.030 to 0.035 inches in thickness, and are separated by spacers of approximately the same thickness.

The spacers 32 have hub portions 34 (FIG. 3) which are non-rotatably received on the square shaft section 30, and generally radial arms 36. The first stage discs 28 and spacers 32 are embraced by heavier, more rigid discs 38 (FIG. 4) to form a sandwich.

Similarly, a second and third series of discs 40 and 42, together forming a secondary turbine stage, are mounted on the square section 30 for rotation therewith and are separated by like spacers 32. The entire assembly or stack is clamped together between heavier discs 44 (FIG. 1) by means of studs 46, which extend completely through the array of discs and through the arms 36 of the spacers 32 therebetween. Nuts 48 are threaded on the studs 46 to hold the stack tightly clamped.

Figure 3:
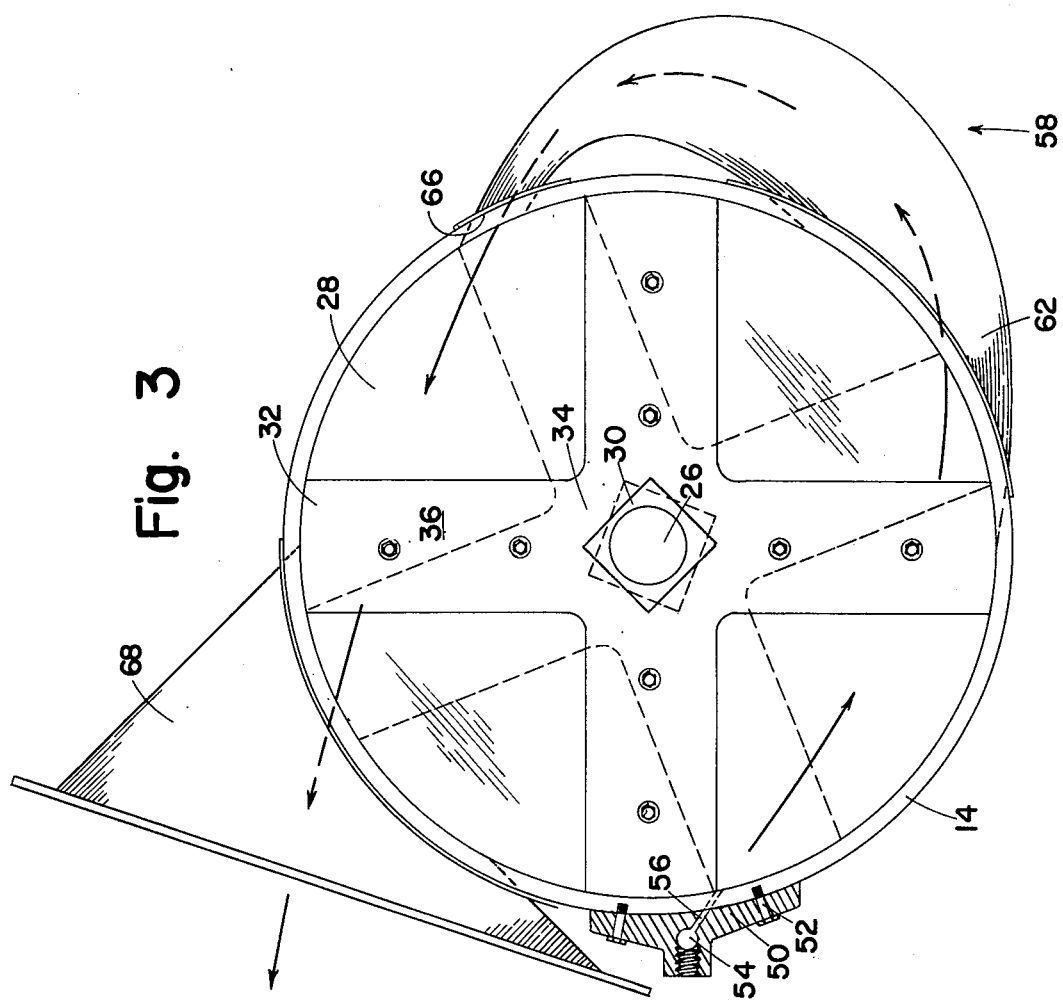
FIG. 3 is an end view of the turbine with side plate removed.
Figure 4:
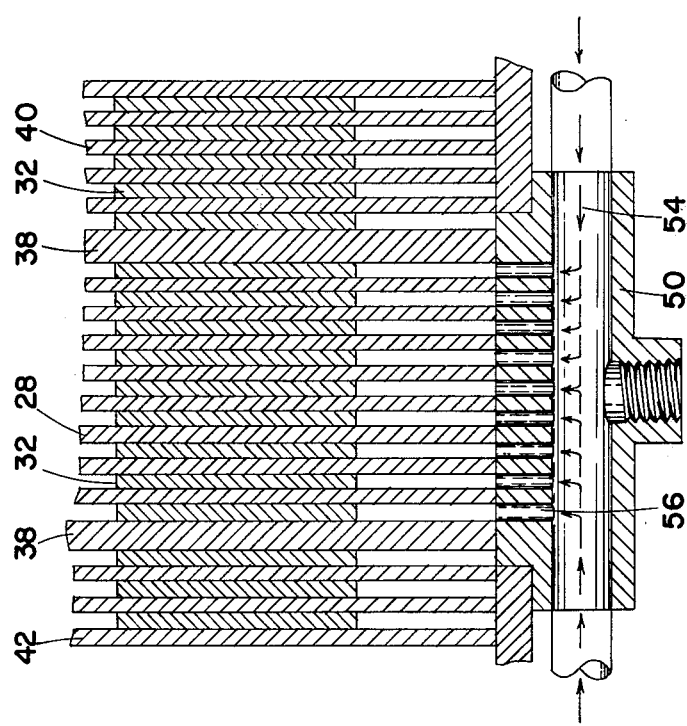
FIG. 4 is an enlarged partial section view of the first stage nozzle.

Referring now to FIGS. 3 and 4, a nozzle 50 is secured to the housing body band 14 in alignment with the first stage series of discs 28, as by means of screws 52. The nozzle 50 includes a header or reservoir duct 54 to both ends of which the driving medium vapor is delivered from a suitable source (not shown). Opening into communication with the header duct or reservoir is a series of outlet jets 56, each of which is disposed in alignment with a spacer member 32 of the first stage series, between the thin, highly polished discs 28.

With the first stage discs 28 mounted between the discs 40 and 42 of the second stage, the second stage stacks offer a sort of shell for the relatively high pressure of the first stage. Further, by dividing the second stage, vibrational symmetry is achieved and non-uniform shaft loading avoided.

Figure 2:
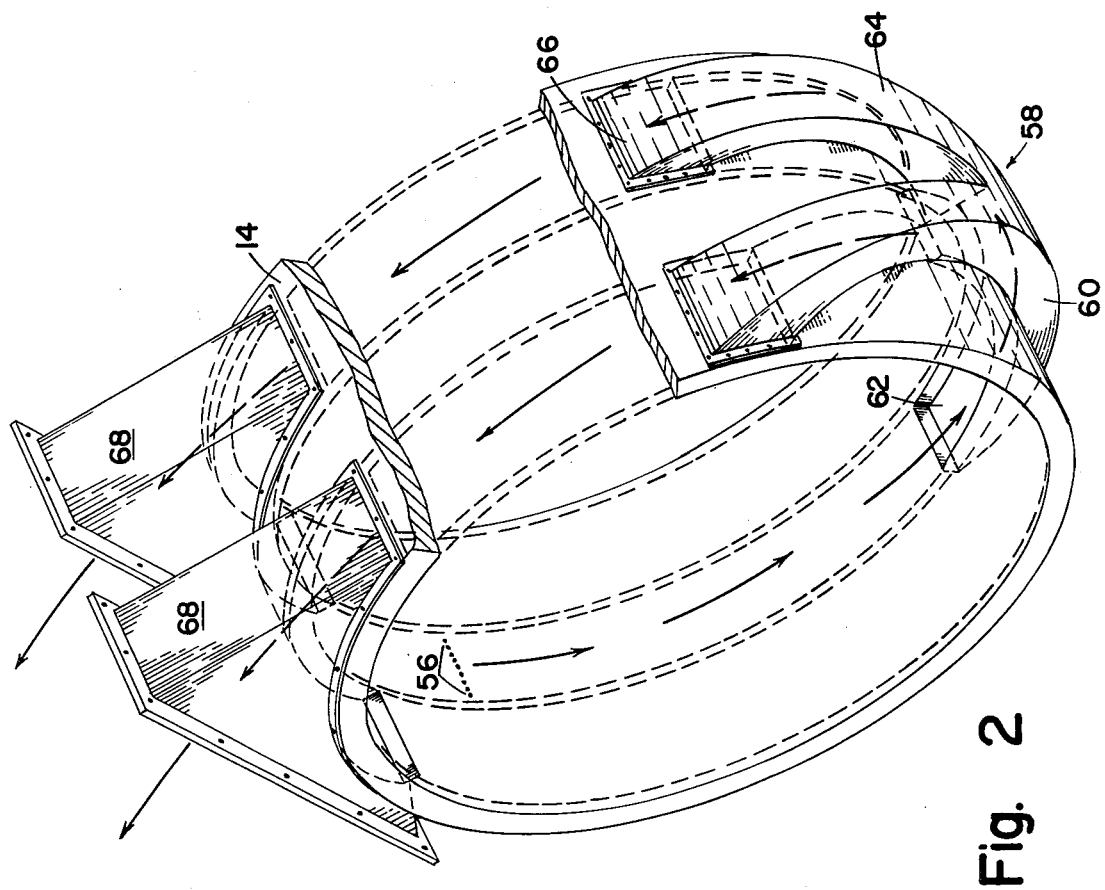
FIG. 2 is a view in perspective, partially broken away, the turbine shell showing flow paths therethrough.

Also mounted on the housing body band 14 is a bifurcated transition manifold 58 which includes a single inlet portion 60 with intake port 62 (FIG. 2) and a pair of outlet portions 64 with discharge ports 66 which, together, are of substantially the same flow capacity as the single intake port 62. As in the case of the first stage jets 56, the discharge ports are disposed to direct jet streams at an angle along chords of the discs 40 and 42. Disposed in alignment to receive the emerging second stage streams are outlet ducts 68 which direct the fluid to a suitable condenser (not shown).

As the fluid medium, I propose employing trichloro-trifluoroethane (Freon 113) as a saturated vapor at a temperature of 275 to 325 fahrenheit and a pressure of 152 to 220 psia. The vapor is jetted through a nozzle jets 56 at an angle of approximately 37 degrees to flow along a chord, as indicated by the arrows in FIGS. 2 and 3, and the vapor tends to adhere to the highly polished surfaces of the discs, and impel them by cohesion. In addition, when the spacer arms 36 reach the position of that shown in phantom on FIG. 3, i.e. just beyond the jet ports 56, the jet streams impinge directly against the edges of the arms 36 to drive them in the nature of an impulse turbine. The jet stream emerging from between the first stage discs enter into transition manifold port 62 and there are divided into two streams to emerge at the second stage discharge ports 66 where they are again directed along chords of the second stage discs 40 and 42 to emerge at the outlets 68, thereafter to be liquified at the condenser (not shown). It is anticipated that the turbine 10 so operated in two stages will deliver a smooth output from 0 to nearly 10,000 rpm.

While this invention has been described in conjunction with preferred embodiments thereof, it is obvious that modification and changes therein may be made by those skilled in the art without departing from the spirit and scope of this invention, as defined by claims appended hereto.

What is described as invention is:

1. A cohesion-type turbine comprising:

a housing;

a shaft rotatably mounted in said housing;

first and second series of thin, polished discs mounted on said shaft to rotate therewith;

means spacing said discs;

a nozzle mounted on said housing in alignment with said first series of discs to direct jets of fluid in spacers therebetween and along chords thereof; and a transition duct on said housing having an inlet opening disposed to receive fluid emerging from said first series and an outlet in alignment with said second series to direct a stream of fluid along chords thereof.

2. The cohesion-type turbine defined by claim 1 including:

a third series of discs mounted on said shaft to rotate therewith;

said first series being disposed intermediate to said second and third series;

said transition duct being bifurcated from a single inlet portion to a pair of outlet portions in alignment with said second and third series.

3. The cohesion turbine defined by claim 1 wherein said spacing means each comprises:

a hub portion; and a plurality of generally radial arms.

4. The cohesion-type turbine defined by claim 3 including:

a plurality of bolt means extending through said first, second and third series and through the radial arms of said spacer means.

5. The cohesion-type turbine defined by claim 1 wherein said nozzle comprises:

a reservoir duct; and a plurality of jet ports opening from said reservoir duct;

each of said ports being aligned with the space between adjacent ones of said first series of discs.

6. The cohesion-type turbine defined by claim 2 wherein:

the flow capacity of said outlet portions is substantially equal to the flow capacity of the inlet portions.

7. The cohesion-type turbine defined by claim 4 wherein:

the other discs of said second and third series are thicker and more rigid than other discs.

* * * * *